Patented Sept. 17, 1935

2,014,415

UNITED STATES PATENT OFFICE 2,014,415

PROCESS FOR THE PREPARATION OF RESINOUS CONDENSATION PRODUCTS FROM XYLENOL ETHERS AND ALDEHYDES

Fritz Seebach, Erkner near Berlin, Germany, assignor to Bakelite Gesellschaft mit beschraenkter Haftung, Berlin, Germany No Drawing. Application October 21, 1932, Serial No. 638,918. In Germany October 22, 1931

7 Claims. (Cl. 260—3)

I have found that the alkyl-ethers or aralkyl ethers of the xylenols may be easily condensed into resins with formaldehyde or other equivalent aldehydes, if desired in the presence of catalysts. These ethers of the xylenols can be readily condensed with the aldehydes into resinous bodies and the resulting condensation products readily dissolve in fatty oils and in a lacquer benzene. The resins are of a light colour and the coatings made therewith show a good light-resistance. In preparing the resins, it is not necessary to start with the ethers of pure xylenols. Excellent products are obtained even from mixtures, as for example a xylenol ether mixture obtained by methylating a technical xylenol mixture.

Example 1

400 parts by weight of xylenol-methyl-ether obtained from technical xylenol, 224 parts of aqueous formaldehyde of 40%, and 12 ccm. of 20% hydrochloric acid are condensed for 8 hours under constant stirring at about 100° C. The resulting resin is evaporated until a temperature of 200° C. is reached. The yield amounts to 400 gram, the product being colorless and readily soluble in fatty oils.

Example 2

Proceeding in the same manner as in Example 1, using, however, xylenol-ethyl-ether. The resulting resin is colorless and dissolves particularly readily in fatty oils and also in a lacquer benzene.

Example 3

In the same manner as in Example 1, 1,3,3-xylenol-methyl-ether is used as initial substance.

Methyl ethers are prepared from xylenols in a well-known manner, as for example by dissolving xylenol in an equivalent quantity of diluted soda lye and reacting the solution with dimethyl-sulfate under stirring. The resulting methyl-ether may be drawn off and distilled. Likewise for example 1 mol of a xylenol mixture can be dissolved in a quantity of a 10-20% aqueous soda lye which contains 1 mol of caustic soda and the ether can be formed by the action of dimethyl-sulfate. For the condensation preferably 1 mol of aldehyde or more is caused to react on the xylenol-ether. However, less than 1 mol of aldehyde can be used. Instead of an aqueous formaldehyde solution solid polymeric aldehydes can be used for condensation, for example trioxymethylene. The condensation of the xylenol-ether with the aldehydes is preferably carried out in an open vessel by boiling under a reflux condenser.

Instead of methyl ethers ethyl ethers and other homologues can be used and further instead of the mixed fatty-aromatic ethers the pure aromatic ethers, for example xylenol-phenyl-ether. For example xylenol-benzyl-ether can also be used. The resulting resins are solid at ordinary temperature. They do not heat-harden or only very slowly. Mixtures of phenols and xylenol-ethers can also be condensed with aldehydes. Such products are heat-hardenable. The hardenable resins can be worked in the usual manner into moulding mixtures, moulded articles or laminated products or the like. The condensation products are soluble in fatty oils, for example lacquer-linseed oil or wood oil; furthermore they are soluble in the solvents generally used for the preparation of lacquers, as for example oil of turpentine, lacquer benzene, or mixtures of benzol and spirits. The non-heat hardenable resins do not lose their oil-solubility upon heating.

What I claim is:

1. Process of preparing resinous condensation products soluble in fatty oils which comprises condensing with an aldehyde a body obtained by etherifying commercial xylenol in an aqueous alkaline solution by the action of an organic sulfate.

2. Process of preparing a resinous condensation product soluble in fatty oil which comprises condensing with an aldehyde a neutral ether of a xylenol selected from the group consisting of alkyl and aralkyl ethers of xylenols.

3. Process of preparing a resinous condensation product soluble in fatty oil which comprises condensing with an aldehyde a mixture of a phenol and a neutral ether of a xylenol selected from the group consisting of alkyl and aralkyl ethers of xylenols.

4. Resinous product soluble in fatty oil comprising the condensation product of an aldehyde and a neutral ether of a xylenol selected from the group consisting of alkyl and aralkyl ethers of xylenols.

5. Resinous product soluble in fatty oil comprising the condensation product of an aldehyde and a mixture of a phenol with a neutral ether of a xylenol selected from the group consisting of alkyl and aralkyl ethers of xylenols.

6. Resinous product soluble in fatty oil comprising the condensation product of an aldehyde and an alkyl xylenol ether.

7. Resinous product soluble in fatty oil comprising the condensation product of an aldehyde and a methyl-xylenol ether.

FRITZ SEEBACH.